(12) United States Patent
Bachmann

(10) Patent No.: US 7,600,807 B2
(45) Date of Patent: Oct. 13, 2009

(54) TRANSVERSE BRIDGE FOR REINFORCING THE TUNNEL REGION OF A FLOOR STRUCTURE OF MOTOR VEHICLE

(75) Inventor: Mike Bachmann, Stuttgart (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 266 days.

(21) Appl. No.: 11/825,804

(22) Filed: Jul. 9, 2007

(65) Prior Publication Data
US 2008/0007089 A1   Jan. 10, 2008

(30) Foreign Application Priority Data
Jul. 7, 2006   (DE) ................ 10 2006 031 452

(51) Int. Cl.
*B60J 9/00* (2006.01)
(52) U.S. Cl. ................... 296/187.08; 296/193.07; 296/204
(58) Field of Classification Search ........... 296/187.03, 296/187.08, 193.07, 204
See application file for complete search history.

(56) References Cited

U.S. PATENT DOCUMENTS

| 5,934,746 | A | 8/1999 | Lehner |
| 6,382,710 | B1 | 5/2002 | Funk et al. |
| 6,491,337 | B2 * | 12/2002 | Averdiek et al. ............ 296/204 |
| 6,793,276 | B2 * | 9/2004 | Sugihara et al. ............ 296/204 |
| 2001/0026083 | A1 | 10/2001 | Averdiek et al. |
| 2006/0103169 | A1 | 5/2006 | Anders |

FOREIGN PATENT DOCUMENTS

| DE | 197 02 669 A1 | 7/1998 |
| DE | 199 54 296 A1 | 5/2001 |
| DE | 100 05 245 A1 | 8/2001 |
| DE | 102 35 532 A1 | 2/2004 |
| DE | 102 35 532 B4 | 3/2005 |
| DE | 10 2004 055 197 A1 | 5/2006 |
| JP | 62-125956 | 6/1987 |
| JP | 6-171552 | 6/1994 |
| JP | 10-226364 | 8/1998 |

* cited by examiner

*Primary Examiner*—Lori L Lyjak

(57) ABSTRACT

A transverse bridge for reinforcing a tunnel region of a floor structure of a motor vehicle is fastened to the floor structure and extends between transverse seat struts. The transverse bridge contains two obliquely extending lateral supporting arms and an upper bridge element connecting the two supporting arms. The transverse bridge contains, in the region of the upper bridge element, on its two longitudinal sides, vertically oriented walls which extend at a small lateral distance from parallel wall portions of the tunnel side walls. During a side impact, the vertical wall portions of the tunnel side walls initially coming into direct contact with the vertically oriented walls of the bridge element, and due to this blocking, the greatest portion of the forces occurring from the side impact are transmitted beyond the tunnel region as pure compressive forces onto the side of the floor structure opposing the impact side.

12 Claims, 4 Drawing Sheets

TRANSVERSE BRIDGE FOR REINFORCING THE TUNNEL REGION OF A FLOOR STRUCTURE OF MOTOR VEHICLE

CROSS-REFERENCE TO RELATED APPLICATION

This application claims the priority, under 35 U.S.C. § 119, of German application DE 10 2006 031 452.2, filed Jul. 7, 2006; the prior application is herewith incorporated by reference in its entirety.

BACKGROUND OF THE INVENTION

Field of the Invention

The invention relates to a transverse bridge for reinforcing the tunnel region of a floor structure of a motor vehicle in dynamic drive operation and in the event of a side impact. The transverse bridge is releasably fastened to the floor structure, preferably provided between two transverse seat struts disposed spaced apart from one another in a transverse direction of the vehicle. The transverse bridge contains two obliquely extending lateral supporting arms and an upper bridge element connecting the two supporting arms. The bridge element extends with its upper edge approximately level with the upper edge of the two transverse seat struts.

A transverse bridge of the aforementioned type may be seen from German patent DE 102 35 532 B4. In this configuration, for fastening the transverse bridge to the floor structure, additional consoles with a U-shaped profile are respectively attached to opposing side walls of the tunnel which positively receive lateral arms of the transverse bridge therein. For securing the transverse bridge to the consoles, each arm is connected to the respective console via two horizontally aligned fastening screws extending in the longitudinal direction of the vehicle and disposed offset to one another in the vertical direction.

For vehicles in which the engine-gearbox unit is positioned against the semi-finished bodywork from below, the horizontally aligned fastening screws extending in the longitudinal direction of the vehicle represent a disadvantageous direction of assembly. Additionally, for securing each transverse bridge additional consoles which may be connected to the tunnel are required.

In the event of a side impact, the obliquely extending lateral support arms of the transverse bridge come into direct contact with obliquely extending side walls of the tunnel disposed adjacent thereto, high transverse loads acting on the supporting arms of the transverse bridge.

SUMMARY OF THE INVENTION

It is accordingly an object of the invention to provide a transverse bridge for reinforcing the tunnel region of a floor structure of a motor vehicle which overcomes the above-mentioned disadvantages of the prior art devices of this general type, that, with good reinforcing action, the assembly of the transverse bridge and the components associated therewith, is simplified and in that, moreover, in the event of a side impact, transverse loads of the lateral supporting arms of the transverse bridge are substantially avoided.

With the foregoing and other objects in view there is provided, in accordance with the invention, a transverse bridge for reinforcing a tunnel region of a floor structure for a motor vehicle, in an event of a side impact and during dynamic drive operations. The transverse bridge is releaseably fastened to the floor structure and is disposed between two transverse seat struts disposed spaced apart from one another in a transverse direction of the motor vehicle. The transverse bridge is fastened to an underside of the two transverse seat struts. The transverse bridge contains two obliquely extending lateral supporting arms and an upper bridge element connecting the two obliquely extending lateral supporting arms. The upper bridge element has an upper edge extending approximately level with an upper edge of the two transverse seat struts. The upper bridge element has two longitudinal sides defining vertically oriented walls connected to the two obliquely extending lateral supporting arms. The vertically oriented walls each extend at a small distance from parallel wall portions of tunnel side walls of the tunnel region. In the event of a side impact, the parallel wall portions of the tunnel side walls initially come into direct contact with the vertically oriented walls of the upper bridge element, as a result of blocking by the parallel wall portions, a greatest portion of forces occurring in the event of the side impact being transmitted beyond the tunnel region as pure compressive forces onto a side of the floor structure opposing an impact side.

It is ensured by the solution according to the invention that the transverse bridges are preassembled on a prefabricated engine-chassis-gearbox unit and then may be secured together to the semi-finished bodywork from below, via vertically disposed fastening elements.

By the arrangement of vertically aligned walls on both longitudinal sides of the upper bridge element of the transverse bridge and corresponding vertical wall portions on the tunnel side walls, it is achieved that in the event of a side impact, first a blocking between the vertical walls of the tunnel side wall and the upper bridge element takes place, so that in the event of the side impact the main load is transmitted as pure compressive force via the upper bridge element onto the side of the floor structure opposing the impact side.

It is achieved by the transversely extending slots on the transverse bridge in the region of the screw fastenings, that in particular the vertical wall portions of the tunnel side walls and/or the transverse seat struts come into direct contact with parallel walls of the upper bridge element. A very low proportion of forces occurring in the event of a side impact is transmitted from the transverse seat strut and/or the tunnel region to the transverse bridge via the screw fastenings and the obliquely extending supporting arms.

The transverse bridge is preferably formed by a ribbed cast part made of a light metal alloy. The transversely extending vertical main ribs, as well as the longitudinally extending vertical ribs, reinforce the transverse bridge sufficiently. The upper limit of the bridge element may have a straight, angled or curved shape. The approximately horizontally aligned plate-shaped fastening portions are configured integrally with the transverse bridge. A rigid connection of the transverse bridge to the semi-finished bodywork (transverse seat strut) is achieved by offsetting the at least two screw fastenings on each fastening portion in the longitudinal, transverse and vertical directions of the vehicle.

Other features which are considered as characteristic for the invention are set forth in the appended claims.

Although the invention is illustrated and described herein as embodied in a transverse bridge for reinforcing the tunnel region of a floor structure of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
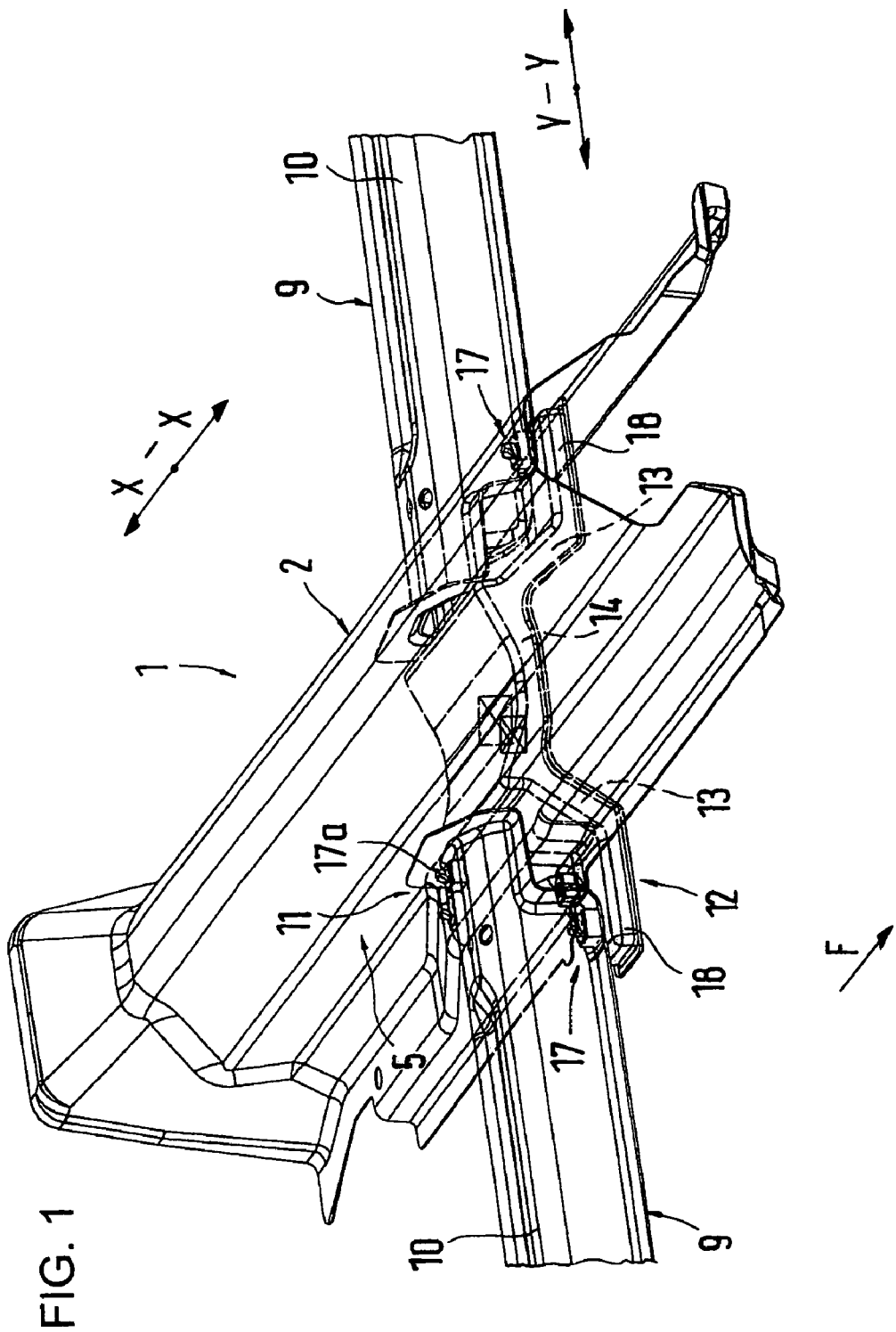
FIG. 1 is a diagrammatic, oblique front perspective partial view of a tunnel region of a floor structure of a motor vehicle bodywork, the tunnel region in the region of transverse seat struts being provided with a transverse bridge positioned from below, according to the invention.
Figure 2:
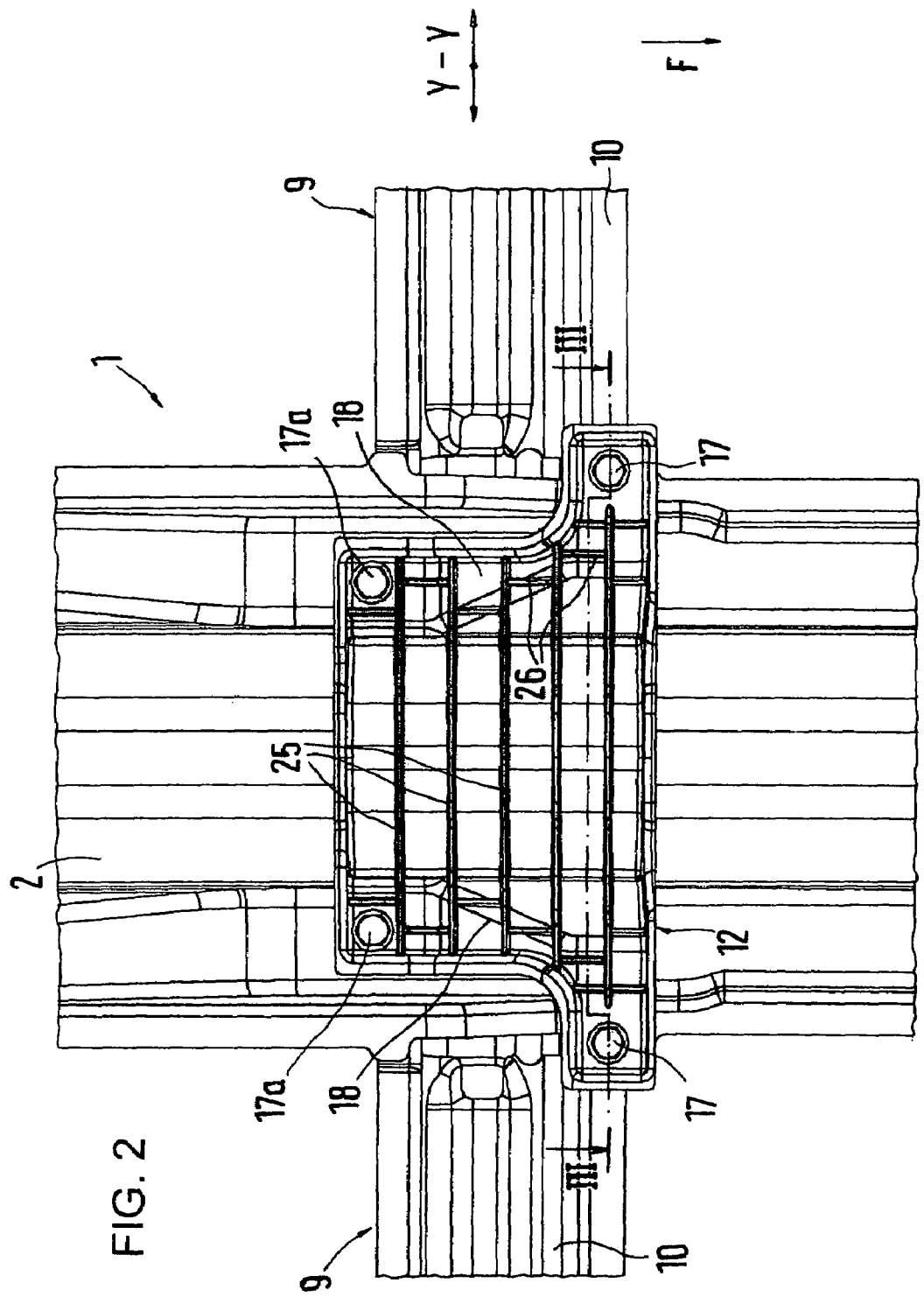
FIG. 2 is a diagrammatic, bottom partial plan view of the transverse bridge and the adjacent floor structure.

Referring now to the figures of the drawing in detail and first, particularly, to FIGS. 1-2 thereof, there is shown a floor structure 1 that is part of a self-supporting semi-finished bodywork of a passenger vehicle and contains in the region of a passenger compartment a tunnel region 2 extending in a longitudinal direction of the vehicle X-X. The tunnel region 2, seen in cross section, is made up of a profiled tunnel sheet 3 that opens downwards and a profiled outer tunnel reinforcement 4 positioned from above on the tunnel sheet 3 and connected thereto (see FIG. 3). Tunnel side walls 5 of the tunnel region 2 respectively contain in a lower end region outwardly oriented oblique portions 6. Preferably, in the region of the obliquely extending portions 6 a respective adjacent vehicle floor 7 is attached to the tunnel region 2 via flanges 8. An outer edge of the vehicle floor 7 is, in a manner not shown in more detail, attached to lateral sillboards.

Transverse seat struts 9 extending in a transverse direction of the vehicle Y-Y are arranged locally on the side of the vehicle floor 7 facing the passenger compartment for the reinforcement thereof. Each transverse seat strut 9 is formed by a cap-shaped profiled sheet metal pressed part 10 which is positioned from above onto the vehicle floor 7 and is fixedly connected thereto, for example by welding, via laterally tailored flanges.

Figure 3:
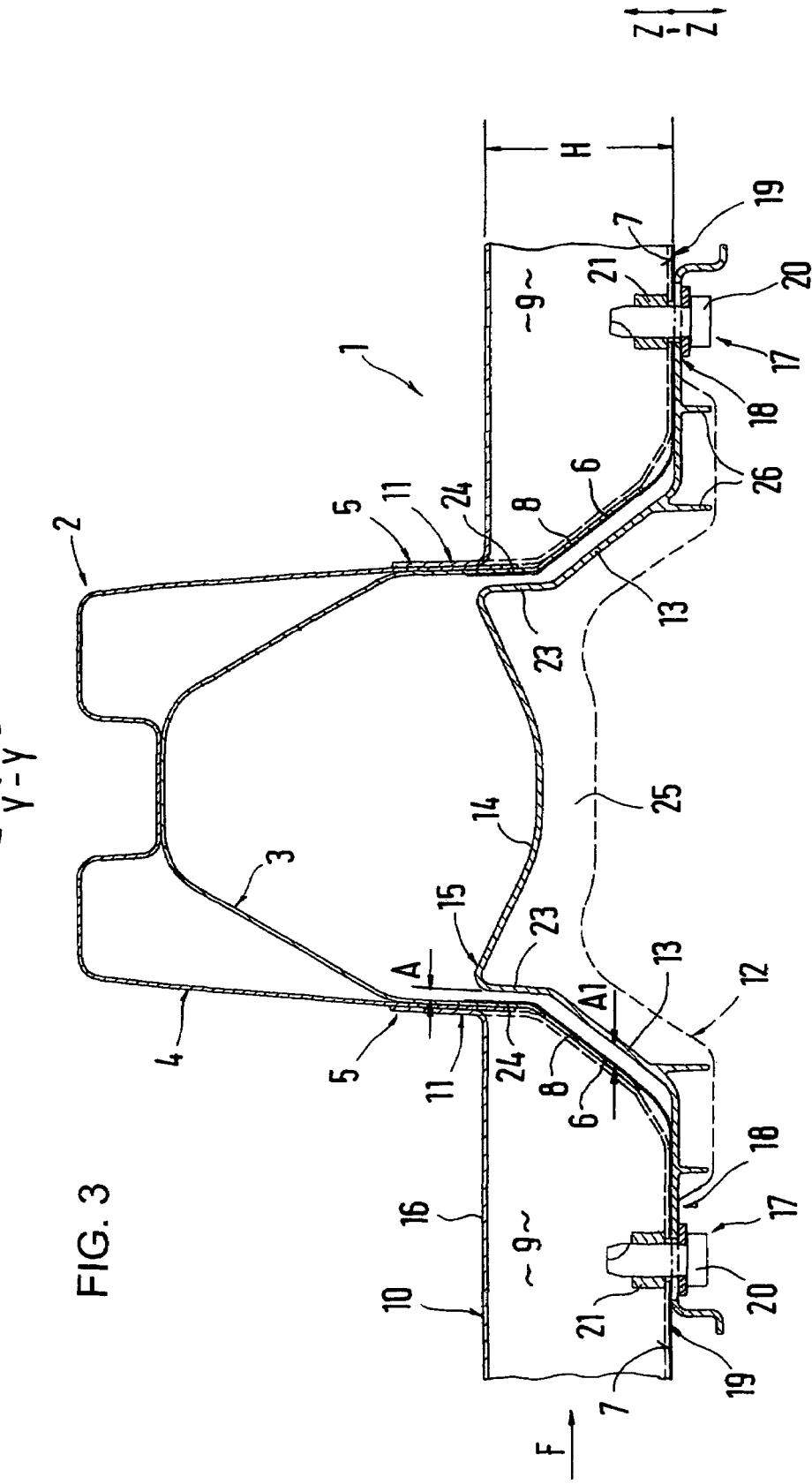
FIG. 3 is a diagrammatic, sectional view taken along the line III-III shown in FIG. 2.

A non-illustrated outer end of each transverse seat strut 9 is attached to the inside of the externally located sillboards, whereas an inner end 11 of each transverse seat strut 9 is attached to the outside of the tunnel region 2. Each transverse seat strut 9 configured in the manner of a hollow beam has a vertical extension H (FIG. 3).

For reinforcing the tunnel region 2 of the floor structure 1 in dynamic drive operation of the passenger vehicle and in the event of a side impact, in the region of the transverse seat struts 9 spaced apart from one another at least one profiled transverse bridge 12 is provided which is releasably connected to the floor structure 1. The transverse bridge 12 shown in FIG. 3 extends—seen in the transverse direction of the vehicle Y-Y—preferably between the two spaced-apart transverse seat struts 9 of the floor structure 1. Each transverse bridge 12 contains two obliquely extending lateral supporting arms 13 and an upper bridge element 14 connecting the two supporting arms 13. An upper edge 15 of the bridge element 14 extends approximately at the same height as an upper edge 16 of the two transverse seat struts 9 (FIG. 3).

A simple and rapid assembly of the transverse bridge 12 and/or of the engine-chassis-gearbox unit, not shown in more detail, preassembled with the transverse bridge 12, is achieved by the transverse bridge 12 being positioned from below on the tunnel region 2 and being fastened via vertically aligned screw fastenings 17, 17a to an underside 19 of the transverse seat struts 9 of the floor structure 1. To this end, the transverse bridge 12 includes in a lower region two plate-shaped fastening portions 18 disposed spaced apart from one another—seen in the transverse direction of the vehicle Y-Y—which are aligned approximately horizontally and bear against the underside 19 of the floor structure 1 in the region of the transverse seat struts 9. The two plate-shaped horizontally aligned fastening portions 18 are integrally attached to the lower ends of the adjacent obliquely extending supporting arms 13 and overlap the tunnel region 2 in the transverse direction of the vehicle Y-Y with their free ends. On each lateral fastening portion 18 of the transverse bridge 12 at least two screw fastenings 17, 17a are respectively provided, arranged spaced apart from one another. A particularly rigid attachment of the transverse bridge 12 to the floor structure 1 is achieved by the at least two screw fastenings 17, 17a of each fastening portion 18 of the transverse bridge 12 being disposed offset to one another in the longitudinal, transverse and vertical directions of the vehicle. According to FIG. 2, the two screw fastenings 17 located in the front—seen in the direction of travel F—are spaced further apart from one another in the transverse direction of the vehicle Y-Y than the screw fastenings 17a located to the rear. Each screw fastening 17, 17a is formed by a fastening screw 20 which preferably may be screwed into a fixed threaded receiver 21 on the mounting side, from the underside 19 of the floor structure 1.

Figure 4:
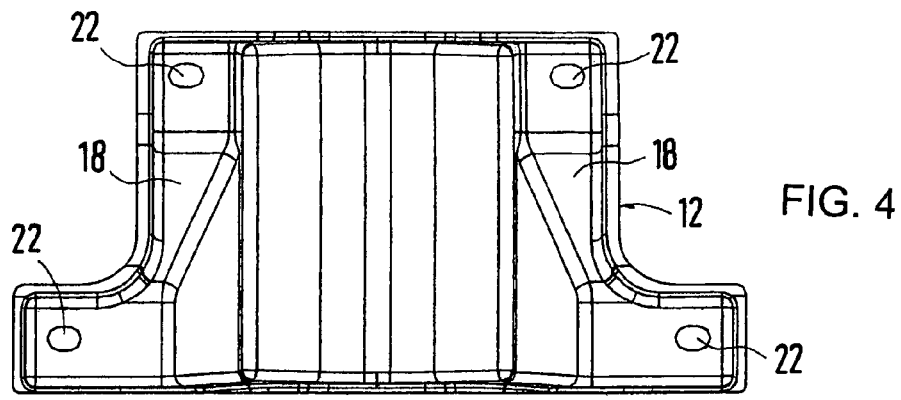
FIG. 4 is a diagrammatic, plan view of the transverse bridge.
Figure 5:
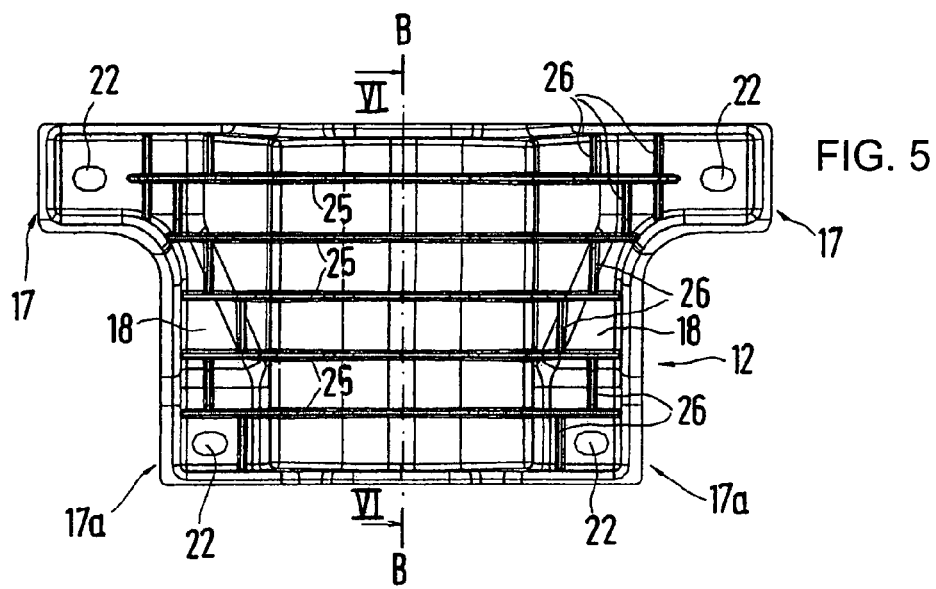
FIG. 5 is a diagrammatic, bottom view of the transverse bridge.
Figure 6:
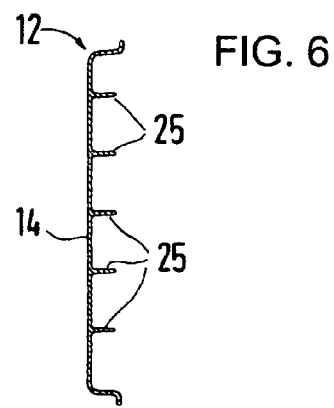
FIG. 6 is a diagrammatic, sectional view taken along the line VI-VI shown in FIG. 5.

The fastening screws 19 of the screw fastenings 17, 17a extending in the vertical direction Z-Z are passed through openings of the transverse bridge 12 for securing the transverse bridge 12, the openings being configured as transversely extending slots 22 (FIGS. 4 and 5).

So that in the event of a side impact, transverse loads of the lateral supporting arms 13 of the transverse bridge 12 are substantially avoided, the transverse bridge 12 respectively contains in the region of the upper bridge element 14 on its two longitudinal sides vertically oriented walls 23 which extend at a small lateral distance (gap A) from parallel wall portions 24 of the tunnel side walls 5. In the event of a side impact, the vertical wall portions 24 of the tunnel side walls 5 initially come into direct contact with the vertical walls 23 of the bridge element 14, as a result of this blocking, the greatest portion of the forces occurring in the event of a side impact being transmitted beyond the tunnel region 2 as pure compressive forces onto the side of the floor structure 1 opposing the impact side.

According to FIG. 3, the vertically aligned lateral walls 23 of the upper bridge element 14 have a smaller vertical extension than the vertical wall portions 24 of the adjacent tunnel side walls 5. The vertical wall portions 24 are attached with their lower ends to the obliquely extending portions 6.

As is visible from FIG. 3, the vertical wall portions 24 extend both below and above the upper face 16 of the transverse seat struts 9, whereas the lateral walls 23 extend substantially below the upper face 16 of the transverse seat strut 9.

The transversely extending slots 22 on the fastening portions 18 of the transverse bridge 12 support the lateral displacement of the floor structure 1 and/or the transverse seat strut 9 in the direction of the transverse bridge 12. When the transverse bridge 12 is installed, the lateral gap regions from the tunnel region 2—seen in the transverse direction of the vehicle—are smaller in the region of the upper bridge element 14 (gap A) than in the region of the obliquely extending supporting arms 13 (gap A1). As a result, it is ensured that in the event of a side impact the blocking is initially carried out between the vertical wall portions 24 of the tunnel side walls 5 and the vertical walls 23 of the upper bridge element 14. Ideally, the upper bridge element 14—seen in the transverse direction of the vehicle—has a linear shape. As, however, inside the tunnel region 2 different vehicle components such as a drive shaft, cooling water pipes, exhaust gas pipes or the like are accommodated, the bridge element 14 contains, according to FIG. 3, a downwardly or upwardly angled or curved shape.

Preferably, the transverse bridge 12 is formed by a ribbed cast part made from a light metal alloy. It is visible from FIGS. 2 and 3 that the transverse bridge 12 contains, for the reinforcement thereof, a plurality of vertical main ribs 25 extending transversely to the longitudinal axis of the vehicle B-B (see FIG. 5). Additionally, two adjacently arranged main ribs 25 in the region of each fastening portion 18 are connected to one another via at least one vertical rib 26 extending in the longitudinal direction of the vehicle X-X. The main ribs 25 extend almost over the entire width of the transverse bridge 12, i.e. they are arranged both in the region of the upper bridge element 14, the two lateral supporting arms 13 and the horizontal fastening portions 18 (see FIG. 3). A cast-on section for a drive shaft bearing may further be provided (not shown in more detail) on the transverse bridge 12.

With the transverse bridge 12 according to the invention, in dynamic drive operation the operating loads (torque, tensile and compressive forces) are transmitted via the screw fastenings 17, 17a, the lateral supporting arms 13 and the upper bridge element 14 from one side of the floor structure beyond the tunnel region 2 onto the other side of the floor structure 1. By the separation of the fastening planes of the screw fastenings 17, 17a in the longitudinal, transverse and vertical directions of the vehicle, high dynamic loads may be effectively transmitted in drive operation.

In the event of a side impact, a blocking of the upper bridge element 14 with the tunnel side wall 5 is initially carried out; the greatest portion of the occurring forces are transmitted as pure compressive forces only via the upper bridge element 14 (compressive load in a straight path without force deflection). Lateral obliquely extending supporting arms 13 only subsequently come into contact with parallel lateral tunnel wall regions, so that relatively small torque/forces have to be absorbed by the lateral supporting arms 13 and the screw fastenings 17, 17a.

The invention claimed is:

1. A transverse bridge for reinforcing a tunnel region of a floor structure for a motor vehicle, in an event of a side impact and during dynamic drive operations, the transverse bridge releaseably fastened to the floor structure and disposed between two transverse seat struts disposed spaced apart from one another in a transverse direction of the motor vehicle, the transverse bridge fastened to an underside of the two transverse seat struts, the transverse bridge comprising:
 two obliquely extending lateral supporting arms; and
 an upper bridge element connecting said two obliquely extending lateral supporting arms, said upper bridge element having an upper edge extending approximately level with an upper edge of the two transverse seat struts, said upper bridge element having two longitudinal sides defining vertically oriented walls connected to said two obliquely extending lateral supporting arms, said vertically oriented walls each extending at a small distance from parallel wall portions of tunnel side walls of the tunnel region, and in the event of the side impact, the parallel wall portions of the tunnel side walls initially come into direct contact with said vertically oriented walls of said upper bridge element, as a result of blocking by the parallel wall portions, a greatest portion of forces occurring in the event of the side impact being transmitted beyond the tunnel region as pure compressive forces onto a side of the floor structure opposing an impact side.

2. The transverse bridge according to claim 1, further comprising two plate-shaped fastening portions disposed in a lower region and spaced apart from one another, and as seen in the transverse direction, are aligned approximately horizontally and bear against the underside of the floor structure in a region of the transverse seat struts.

3. The transverse bridge according to claim 2, further comprising at least two screw fastenings disposed on each said two plate-shaped fastening portions and disposed spaced apart from one another.

4. The transverse bridge according to claim 3, wherein said at least two screw fastenings of each of said two plate-shaped fastening portions are disposed offset to one another in longitudinal, transverse and vertical directions of the motor vehicle.

5. The transverse bridge according to claim 3, wherein:
 each of said two plate-shaped fastening portions have openings formed therein, said openings are transversely extending slots; and
 each of said screw fastenings has fastening screws extending in a vertical direction, pass through said openings for securing the transverse bridge.

6. The transverse bridge according to claim 1, wherein the transverse bridge is a ribbed cast part made of a light metal alloy.

7. The transverse bridge according to claim 3, further comprising a plurality of vertical main ribs extending transversely to a longitudinal axis of the motor vehicle for reinforcing the transverse bridge, said vertical main ribs extending from said upper bridge element.

8. The transverse bridge according to claim 7, further comprising vertical ribs and two adjacently disposed ones of said vertical main ribs in a region of each of said fastening portions are connected to one another via at least one of said vertical ribs extending in a longitudinal direction of the motor vehicle.

9. The transverse bridge according to claim 1, wherein said upper bridge element has an upper limit with a shape selected from the group consisting of straight shapes, angled shapes and curved shapes.

10. The transverse bridge according to claim 1, wherein when the transverse bridge is installed, lateral gap regions between the transverse bridge and the tunnel region, seen in the transverse direction of the vehicle, are smaller in a region of said upper bridge element than in a region of said two obliquely extending supporting arms.

11. The transverse bridge according to claim 1, wherein said two obliquely extending lateral supporting arms and said upper bridge element forming the transverse bridge are configured as a ribbed cast part made of a light metal alloy.

12. A floor structure for a motor vehicle, the floor structure comprising:
 a tunnel region having tunnel side walls defining wall portions;
 two transverse seat struts disposed spaced apart from one another in a transverse direction of the motor vehicle and each having an underside and an upper edge;

a transverse bridge reinforcing said tunnel region and disposed between said two transverse seat struts, said transverse bridge fastened to said underside of said two transverse seat struts, the transverse bridge including:
   two obliquely extending lateral supporting arms; and
   an upper bridge element connecting said two obliquely extending lateral supporting arms, said upper bridge element having an upper edge extending approximately level with said upper edge of said two transverse seat struts, said upper bridge element having two longitudinal sides defining vertically oriented walls connected to said two obliquely extending lateral supporting arms, said vertically oriented walls each extending at a small distance from parallel said wall portions of said tunnel side walls of said tunnel region, and in an event of a side impact, said wall portions of said tunnel side walls initially come into direct contact with said vertically oriented walls of said upper bridge element, as a result of blocking by said wall portions, a greatest portion of forces occurring in the event of the side impact being transmitted beyond said tunnel region as pure compressive forces onto a side of the floor structure opposing an impact side.

\* \* \* \* \*